(12) United States Patent
Bugatti

(10) Patent No.: US 6,860,177 B2
(45) Date of Patent: Mar. 1, 2005

(54) ANTI-FRAUD LOCK SCREW WITH A FREELY ROTATING DOME ON A POLYGONAL HEAD

(75) Inventor: Vittorio Bugatti, Castegnato (IT)

(73) Assignee: Valvosanitaria Bugatti S.p.A., Castegnato Brescia (IT)

( * ) Notice: Subject to any disclaimer, the term of this patent is extended or adjusted under 35 U.S.C. 154(b) by 0 days.

(21) Appl. No.: 10/264,334

(22) Filed: Oct. 3, 2002

(65) Prior Publication Data

US 2003/0077146 A1 Apr. 24, 2003

(30) Foreign Application Priority Data

Oct. 18, 2001 (IT) ........................................ 2001/000086

(51) Int. Cl.[7] .................. B25B 13/56; F16B 23/00
(52) U.S. Cl. .................. 81/176.15; 81/64; 81/3.44; 411/910
(58) Field of Search .................. 81/176.1, 176.15, 81/176.2, 176.3, 64, 3.44; 411/910, 402, 258; 70/232, 230; 137/383

(56) References Cited

U.S. PATENT DOCUMENTS

| | | | |
|---|---|---|---|
| 66,585 A | * 7/1867 | Harvey | ........................ 81/443 |
| 3,034,386 A | * 5/1962 | Corlett et al. | ................. 81/112 |
| 3,060,785 A | * 10/1962 | Corlett | |
| 3,604,487 A | * 9/1971 | Gilbert | ........................ 81/443 |
| 4,081,979 A | * 4/1978 | Dawson | |
| 4,324,516 A | * 4/1982 | Sain | |
| 4,504,180 A | * 3/1985 | Ishii | |
| 4,521,146 A | * 6/1985 | Wharton | |
| 5,071,300 A | * 12/1991 | McCauley | |
| 5,280,941 A | * 1/1994 | Guhlin | |
| 5,417,529 A | * 5/1995 | Volkmann | |
| 6,276,662 B1 | * 8/2001 | Bugatti | |
| 6,305,890 B1 | * 10/2001 | Okamura | ..................... 411/431 |

* cited by examiner

Primary Examiner—Flemming Saether
(74) Attorney, Agent, or Firm—McGlew and Tuttle, P.C.

(57) ABSTRACT

This invention concerns a screw for the anti-fraud locking of a throttle or clamp lever on the control rod of a valve shutter or stopcock, comprising a threaded shank having a polygonal head surmounted by a truncated-cone shaped dome, semi-spherical or of other shape, the base of which extends over the edge of the perimeter surface of said polygonal head, where said dome is free to turn around the shank above said polygonal head, so that only by means of a special tool can the threaded screw shank be tightened or loosened by means of the nut, while by operating on the dome with any tool or utensil, no effect is achieved as this is able to turn idly around the threaded shank.

14 Claims, 1 Drawing Sheet

ANTI-FRAUD LOCK SCREW WITH A FREELY ROTATING DOME ON A POLYGONAL HEAD

FIELD OF THE INVENTION

This invention concerns the perfecting of a screw for the anti-fraud locking of a throttle or clamp lever on the control rod of a valve shutter or stopcock.

BACKGROUND OF THE INVENTION

In a previous patent application of the same applicant, a valve or stopcock for fluids was proposed comprising a body, a swivel shutter in said body movable between a closed position and an open position, a control rod for said shutter, and a throttle or clamp lever keyed to said rod for the rotation of the shutter. The throttle or clamp lever is fastened axially on the rod by means of a lock screw that is tightened in a threaded hole envisaged at the top of the rod itself. In order to prevent uncontrolled disassembly of the throttle or clamp lever, the lock screw is configured to be tightened and loosened only by using a specific tool at the disposal only of whosoever is charged with managing the use or non-use of the valve to prevent tampering or frauds.

According to a preferred embodiment of this background invention, the lock screw has a polygonal head surmounted by a truncated-cone shaped dome, semi-spherical or of other shape, the base of which extends over the edge of the perimeter surface of the polygonal head, and the tool for turning said screw has at least two expansible elastic jaws to widen and extend in an axial direction the base extending over the dome on the head of the screw and then contractible to engage the perimeter surface of the polygonal head of the screw.

The putting into practice of the model presented here, however, has shown that with certain tools or utensils different from that envisaged, it is nonetheless possible, albeit with difficulty, to loosen the lock screw by locking onto the base of the dome that extends over the polygonal head.

SUMMARY OF THE INVENTION

The purpose of this invention is to provide a perfected anti-fraud lock screw that in fact prevents any loosening attempt, with any tool or utensil, and consequently tampering with the valve or stopcock to which it is fitted.

This purpose is achieved by means of a screw that fastens a throttle or clamp lever at the control rod of a valve shutter or stopcock, comprising a threaded shank having a polygonal head surmounted by a truncated-cone shaped dome semi-spherical or of other shape, the base of which extends over the edge of the perimeter surface of said polygonal head, where said dome is free to turn around the axis of the screw, above said polygonal head.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
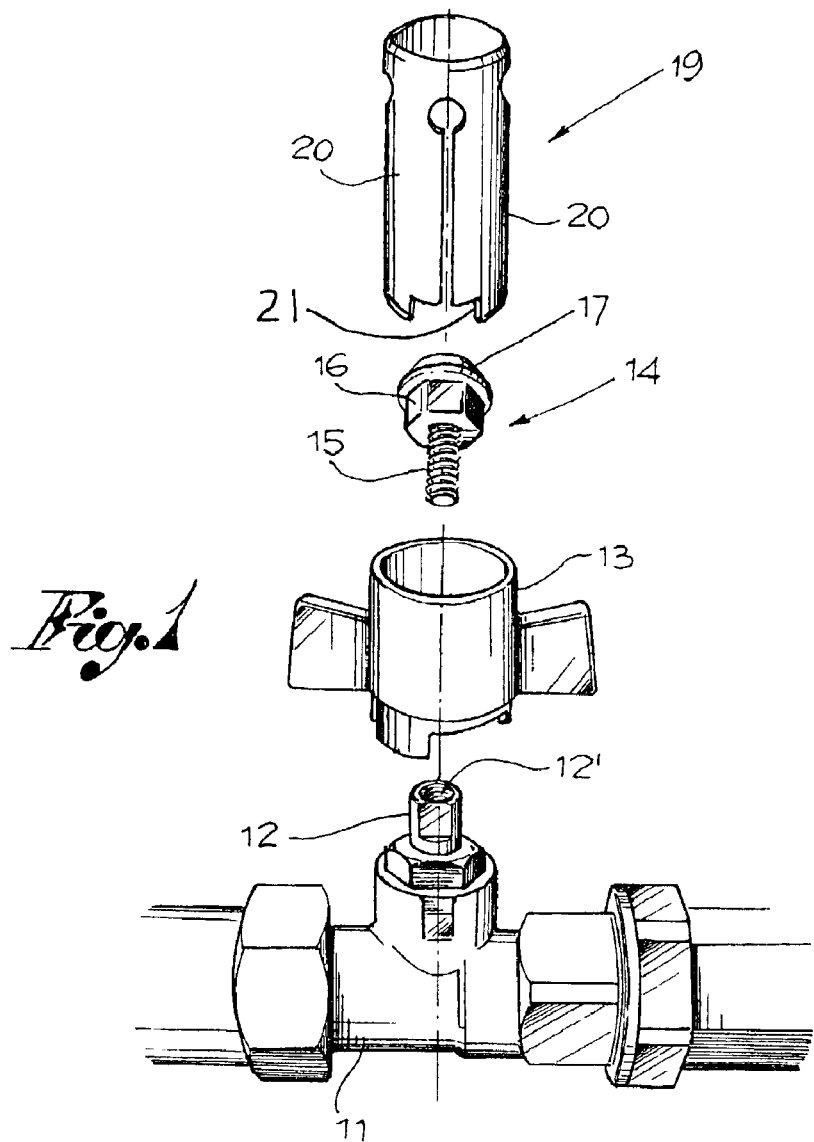
FIG. 1 shows separated view of a valve with a throttle or clamp lever and relevant anti-fraud retention screw.
Figure 2:
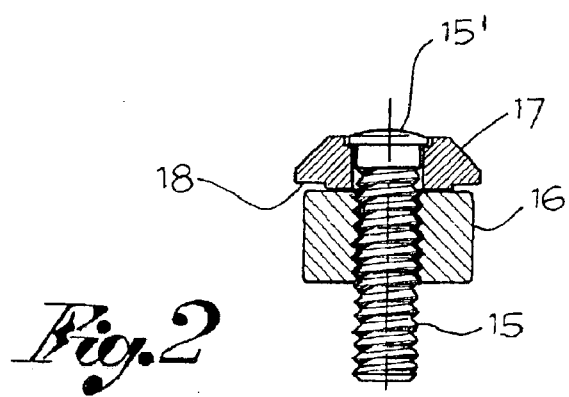
FIG. 2 shows in longitudinal section, the anti-fraud retention screw according to the invention.

Referring to the drawings in particular, FIG. 1 approximately shows a ball valve, the body 11 which encloses, in a known manner, a round shutter (not shown) to which is connected a swivel rod 12 by means of which the shutter can turn by 90° between a fluid transit opening position and a closing position. For such rotation, to the rod 12 is keyed to a throttle or clamp lever 13 which has a housing with a recess. This lever 13 is axially fitted on the rod 12 by means of a retention screw 14 arranged in the recess of the lever 13 and the screw 14 screws into a threaded hole 12' envisaged at the top of the rod.

The retention screw 14 consists of a threaded shank 15 with a polygonal head 16 surmounted by a truncated-cone shaped dome 17, semi-spherical or of other shape with a base 18 which extends over the edge of the polygonal surface 16 of the head. The base 18 that extends over the edge of dome 17 prevents access to the polygonal head 16 of the screw for the rotation of this by means of a standard polygonal tubular spanner. Access to the polygonal head 16 of the retention screw 14 is thus only possible with a tool 19 having at least two lock jaws 20 each with a flat inner section 21 corresponding to a face of the polygonal head of the screw. The jaws 20 of the tool are elastic such as to expand to extend over the base 18 of the dome 17 when the tool is pushed with force on the screw head to engage with its flat inner sections 21 the faces of the polygonal head of the screw for the rotation of the latter. On the other hand, the tool can be separated from the screw head by forcefully moving it away from this.

According to the invention, the dome 17 is free to rotate around the shank 15 of screw 14 above the polygonal head 16 which on the other hand is integral with shank 15. For example, the polygonal head 16 can consist of a nut screwed onto the shank 15 of the screw and secured to this by gluing, while the dome 17 can be made of a substantially trapezoid section ring-shaped part located above the nut and held around the shank 15 by an edging 15' envisaged at the top end of this. To glue the nut, an anaerobic adhesive can be used such as Loctite.

This way, only by using the special tool 19 is it possible to loosen or tighten the threaded shank 15 of the screw 14 by adjusting nut 16, while if the dome 18 is engaged with any tool or utensil, no effect is achieved as this rotates freely around the threaded shank.

While specific embodiments of the invention have been shown and described in detail to illustrate the application of the principles of the invention, it will be understood that the invention may be embodied otherwise without departing from such principles.

What is claimed is:

1. A screw for the anti-fraud locking of a throttle or clamp lever of the control rod of a shutter of a valve or stopcock, the screw comprising:

an at least partially threaded shank having a polygonal head surmounted by a truncated-cone shaped dome, a base of said dome extending over an edge of a perimeter surface of said polygonal head, wherein said dome is free to turn around said shank above said polygonal head;

a housing defining a recess, said polygonal head and said dome are spaced from an inside of said recess of said housing, said housing and said polygonal head define a tool space; and a tool including a base and a lock jaw, said lock jaw being elastically connected to said base in order to slide over and past said dome into said tool space, said lock jaw having a shape to engage with said polygonal head and rotate said polygon head.

2. A screw according to claim 1, wherein said dome consists of a ring-shaped part placed and revolving around said shank and secured to said shank by means of an edging at a top end of said shank.

3. A screw according to claim 1, wherein said polygonal head consists of a nut screwed onto and secured to said shank.

4. A screw according to claim 3, wherein said nut is secured to said shank by gluing.

5. A screw according to claim 3, wherein said nut is secured to said shank by means of an anaerobic adhesive.

6. A device for the anti-fraud locking of a valve, the device comprising:

a screw with an at least partially threaded shank having a polygonal head surmounted by a truncated-cone shaped dome, a base of said dome extending over an edge of a perimeter surface of said polygonal head, wherein said dome is free to turn around said shank above said polygonal head;

a valve body containing a fluid passage and a rotatable valve element located in said fluid passage, said valve element controlling a fluid flow through said fluid passage, the fluid flow being adjustable upon rotation of said valve element;

a swivel rod, said swivel rod being mechanically connected to said valve element; and a lever, said lever being mechanically connected to said swivel rod so as to rotate said valve element upon application of a force to said lever, to in turn control said fluid flow by rotation of said rotatable valve element, said lever being retained and locked on said swivel rod by said screw, wherein;

said lever defines a recess, said polygon head and said dome are spaced from an inside of said recess, said lever and said polygonal head define a tool space;

a tool is provided with a base and a lock jaw, said lock jaw being elastically connected to said base in order to slide over and past said dome into said tool space, said lock jaw having a shape to engage with said polygonal head and rotate said polygonal head.

7. A device according to claim 6, wherein said dome consists of a ring-shaped part placed and revolving around said shank and secured to said shank by means of an edging at a top end of said shank.

8. A device according to claim 6, wherein said polygonal head consists of a nut screwed onto and secured to said shank.

9. A device according to claim 8, wherein said nut is secured to said shank by gluing.

10. A device according to claim 8, wherein said nut is secured to said shank by means of an anaerobic adhesive.

11. An anti-fraud locking arrangement comprising:

a housing defining a recess;

a threaded shank having a polygonal head with a perimeter edge, said polygon head being arranged in said recess of said housing;

a cone shaped dome arranged on said polygonal head and rotatably connected to said polygonal head said dome having a base which extends radially outwardly farther than said perimeter edge, said dome also being arranged in said recess of said housing, wherein;

said polygonal head and said dome are spaced from an inside of said recess of said housing, said housing and said polygonal head define a tool space;

a tool is provided with a base and a lock jaw, said lock jaw being elastically connected to said base in order to slide over and past said dome into said tool space, said lock jaw having a shape to engage with said polygonal head and rotate said polygon head.

12. An arrangement in accordance with claim 11, further comprising:

a body threadedly engaged with said threaded shank, said threaded shank connecting said housing to said body, said housing defining a notch, and said body defining a projection, said notch and said projection being arranged to engage each other and limit rotation of said housing with respect to said body.

13. An arrangement in accordance with claim 11, wherein:

said threaded shank has an edging at one end, said dome being axially slidable on said threaded shank, said edging blocking said dome from sliding off said end of said threaded shank;

said polygonal head is a nut threaded onto said threaded shank, said dome being arranged between said edging and said nut.

14. An arrangement in accordance with claim 11, wherein:

a body is threadedly engaged with said threaded shank, said threaded shank connecting said housing to said body, said housing defining a notch, and said body defining a projection, said notch and said projection being arranged to engage each other and limit rotation of said housing with respect to said body;

said threaded shank has an edging at one end, said dome being axially slidable on said threaded shank, said edging blocking said dome from sliding off said end of said threaded shank;

said polygonal head is a nut threaded onto said threaded shank, said dome being arranged between said edging and said nut.

* * * * *